(12) United States Patent
Flynn

(10) Patent No.: US 7,034,679 B2
(45) Date of Patent: Apr. 25, 2006

(54) SYSTEM AND METHOD FOR ENHANCING SECURITY AT A SELF-CHECKOUT STATION

(75) Inventor: Samuel W. Flynn, Angus (GB)

(73) Assignee: NCR Corporation, Dayton, OH (US)

( * ) Notice: Subject to any disclaimer, the term of this patent is extended or adjusted under 35 U.S.C. 154(b) by 376 days.

(21) Appl. No.: 10/036,585

(22) Filed: Dec. 31, 2001

(65) Prior Publication Data
US 2003/0122667 A1  Jul. 3, 2003

(51) Int. Cl.
*G08B 21/00* (2006.01)
(52) U.S. Cl. .................. 340/540; 340/571; 705/23
(58) Field of Classification Search ............. 340/540; 348/150, 143, 142, 207, 208.3; 705/23–25
See application file for complete search history.

(56) References Cited

U.S. PATENT DOCUMENTS

| | | | | |
|---|---|---|---|---|
| 4,676,343 A | * | 6/1987 | Humble et al. | 186/61 |
| 4,945,367 A | * | 7/1990 | Blackshear | 396/427 |
| 4,964,053 A | * | 10/1990 | Humble | 705/416 |
| 5,025,477 A | * | 6/1991 | Baitz et al. | 382/100 |
| 5,083,638 A | * | 1/1992 | Schneider | 186/61 |
| 5,111,288 A | * | 5/1992 | Blackshear | 348/143 |
| 5,115,888 A | * | 5/1992 | Schneider | 186/61 |
| 5,426,282 A | * | 6/1995 | Humble | 235/383 |
| 5,494,136 A | * | 2/1996 | Humble | 186/61 |
| 5,497,314 A | * | 3/1996 | Novak | 705/17 |
| 5,534,851 A | * | 7/1996 | Russek | 340/573.4 |
| 6,032,128 A | * | 2/2000 | Morrison et al. | 705/23 |
| 6,343,739 B1 | * | 2/2002 | Lippert | 235/383 |
| 6,408,279 B1 | * | 6/2002 | Mason | 705/16 |
| 6,793,128 B1 | * | 9/2004 | Huffman | 235/375 |

\* cited by examiner

*Primary Examiner*—Thomas J. Mullen, Jr.
*Assistant Examiner*—Son Tang
(74) *Attorney, Agent, or Firm*—Maginot, Moore & Beck LLP; Paul W. Martin

(57) ABSTRACT

A system controls security devices to enhance the security of self-checkout stations. The system includes security agent applications executing in the terminals of a plurality of self-checkout stations. The security agent software generates and transmits event messages regarding security events occurring at a station to a server. The server assigns a priority level to the event messages and sends the prioritized event messages as alert messages to a security controller. The security controller is coupled to security cameras, image data storage devices, and image data display devices and generates control messages for these devices in accordance with the alert messages received. The control messages for the security cameras operate the cameras to zoom, focus, tilt, or pan with respect to the events occurring at a station. Image data storage devices are coupled by the controller to cameras for the purpose of recording image data from the station in either a continuous or still image manner. The controller may insert visual alert indicators in the video stream of a camera directed to a monitor or an audible tone in the audio of the video stream to alert security personnel to the display of ongoing security events at a station. The controller may also be coupled to a paging system to generate pages for security personnel that identify a station where a security event is occurring so the security officer may observe the station during the incident.

20 Claims, 3 Drawing Sheets

SYSTEM AND METHOD FOR ENHANCING SECURITY AT A SELF-CHECKOUT STATION

FIELD OF THE INVENTION

This invention relates generally to methods and systems for providing security at a self-checkout station and, more particularly, to methods and systems for providing security at self-checkout stations located within the viewing field of security cameras.

BACKGROUND OF THE INVENTION

Self-checkout stations at grocery stores and other retail stores are well known. The stations permit a consumer to scan items for purchase so the station may identify the items and a corresponding price. When the consumer indicates all items for purchase have been presented to the terminal, a sub-total is accumulated, any taxes and discounts are computed, and a total amount due is displayed for the consumer. The station then allows the consumer to select a payment method. The station presents menu selections to the consumer so funds are transferred to the retailer's account. Upon confirmation of payment, the items are released to the consumer.

A self-checkout station typically includes a terminal, a scanner and scales for reading unit price codes (UPC) and determining item weight, a cashier keypad and display, a POS terminal for payment entry, a receipt printer, a change unit, and a checkout area for holding items once they have been scanned. The terminal also includes a display, a processor, memory, programmed instructions, and data peripherals to control the operations of the station. The programmed instructions may contain modules for querying for item prices, computing totals and performing other functions related to the purchase of items through a self-checkout station. Some checkout station may also include security agent software that operates to reduce the likelihood that the consumer leaves without scanning all of the items or exchanges scanned items with more expensive items that have not been scanned.

Typically, previously known security agent software display messages directing the consumer to remove an item from the bagging area and rescan the item. Such software may also issue an audible warning for the consumer to repeat some action in response to detection of some activity that may indicate a fraud being perpetrated. Although such actions are intended to prevent the likelihood of a perpetrator completing a fraudulent checkout, they do not effectively lead to the apprehension of those attempting such fraudulent transactions or the identification of such persons for enhanced future scrutiny of such persons. In previously known self-checkout stations, those attempting to defraud a retail store may simply leave without completing any transaction or make a small purchase before leaving. Thus, such persons may be able to leave the store and contemplate another effort to defeat the security agent software without concern that their previous attempt and personal identity have become known to the store's security personnel.

Although many self-checkout stations have a security camera mounted on a pole coupled to the station or several stations may be located within the viewing area of a single security camera, identification of perpetrators is still difficult. Identification data is difficult to obtain because the defrauder may orient himself or herself in a way that diminishes the amount of detail available to the camera. Additionally, many security cameras have a limited amount of image storage and may not record image data unless a security violation is detected or the camera may overwrite image data before security personnel can retrieve the image data. Also, a single camera rotating within a dome housing may sweep the checkout area where defrauding activity is occurring only once, if at all, during execution of the defrauding activity.

What is needed is a way of better collecting identification data of persons operating a self-checkout station.

What is needed is a way of improving the likelihood of collecting detail image data of persons operating a self-checkout station.

What is needed is a way of securing storage of image data pertaining to defrauding activity that occurs at a self-checkout station.

What is needed is a way of notifying security personnel of defrauding activity while it is occurring so the perpetrator may be apprehended.

SUMMARY OF THE INVENTION

The above-noted limitations of previously known systems and methods for providing security at checkout stations have been overcome by a system and method that operate in accordance with the principles of the present invention. The system of the present invention comprises a security controller for parsing an alert message that identifies a self-checkout station, an event occurring at the self-checkout station, and a priority level for the event; and; a security device coupled to the security controller so that the security device receives control messages from the security controller corresponding to the priority level assigned to the event identified in the alert message. Preferably, several self-checkout stations are coupled together on a computer network and a computer housed in one of the stations may be used as a security server for all of the security agent software coupled to the network. The security server receives event messages from security agent software regarding security events occurring at the station. The event messages may be generated in response to items being placed in the bagging area without scanning or upon detection of items of unequal weight being exchanged in the bagging area, for example. The security server determines the priority of the event messages and sends them according to their priorities to a security controller.

The security controller is preferably located in a security office of the store in which the self-checkout station is located. The controller may send control messages to any one or number of cameras coupled to the controller. For example, control messages may be sent to a dome camera recording images of the stations on a sweep basis or to a camera mounted to one of the stations coupled to the controller. The control messages may be used to stop a dome camera sweeping to record only images at a station where suspected fraudulent activity is occurring. The control messages may also be used to operate a servo-mechanism associated with any camera coupled to the controller, so the camera or cameras may be panned, tilted, or focused to enhance the recording of image data at the station. The control messages may also be used to divert a video stream from the camera being controlled to a video camera recorder (VCR) for storage or to a frame grabber for still image storage. Also, the control messages may be used to provide a visual alert message or audible alter tone on a security monitor being viewed by security personnel which has its input coupled to the camera being controlled by the security controller. The visual alert message and audible tones may be used to attract the attention of security personnel to the activity being displayed on the monitor. In yet another embodiment of the present invention, the visual alert message may include an identifier of the station, an event identifier, or combination of these components to provide useful information to the security personnel observing the displayed image. In yet another usage, a control message may operate a paging unit to transmit a message to a pager unit on the belt of a security officer in the store with a code identifying the station where the suspicious activity is occurring. Also, if security personnel have cellphones, text messages and image data may be sent to an automated device for calling a security officer's cellphone with the text message and image data. The text message may include identifying information such as a station identifier to help direct the officer to the appropriate station. In this manner, the system of the present invention may lead to an improved opportunity for the apprehension of defrauders. Even if the perpetrator is not apprehended, there is a greater likelihood that more accurate image data of the defrauder has been captured and such data is more useful for analysis and defrauder identification.

The method of the present invention includes parsing an alert message that identifies a self-checkout station, an event occurring at the self-checkout station, and a priority level for the event; and generating control messages for security devices corresponding to the priority level assigned to the event identified in the alert message. One security device may be a dome camera sweeping more than one checkout station and/or an array of cameras such as those mounted at the checkout stations where the events being used to control the device are occurring. The control of a camera may include operating a servo-mechanism associated with the camera to alter its position or to pan, focus, or zoom the view being generated by the camera. Additionally, the control operation may include operating a camera mounted to another station to obtain a different view of the station generating the event messages. The control operation may also include generating an alert message at a monitor where the events corresponding to the event messages are being displayed. The alert messages may include a visual message displayed on the monitor or an audible tone to attract attention of security personnel to the monitor display. The visual message may include blinking or other visual indicators for attracting attention as well as station and/or event identification data. Other control operations include directing the video stream from the camera viewing the events at the station generating the event messages to a VCR or frame grabber for video or still image recording, respectively. Also, a control operation may be performed to send a paging message to a security officer in the store. The paging message may include a station identifier so the paged security officer may respond by going to the station for further observation. If the security officers are supplied with cellphones, the method includes calling a cellphone associated with a security officer and sending text and/or image data to the cellphone. The text data may include station and/or event identification data.

It is an object of the present invention to direct event data from a self-checkout station to a security controller for improved operation of security devices.

It is an object of the present invention to determine control operations from event data occurring at a self-checkout station that improve the quality and quantity of image data captured from a camera monitoring one or more stations.

It is an object of the present invention to better direct the attention of security officers to monitors displaying events occurring at a station that warrant scrutiny by an officer.

It is an object of the present invention to increase the likelihood of defrauder apprehension on the store's premises.

These and other advantages and features of the present invention may be discerned from reviewing the accompanying drawings and the detailed description of the invention.

BRIEF DESCRIPTION OF THE DRAWINGS

The present invention may take form in various system and method components and arrangement of system and method components. The drawings are only for purposes of illustrating an exemplary embodiment and are not to be construed as limiting the invention.

DETAILED DESCRIPTION OF THE INVENTION

Figure 1:
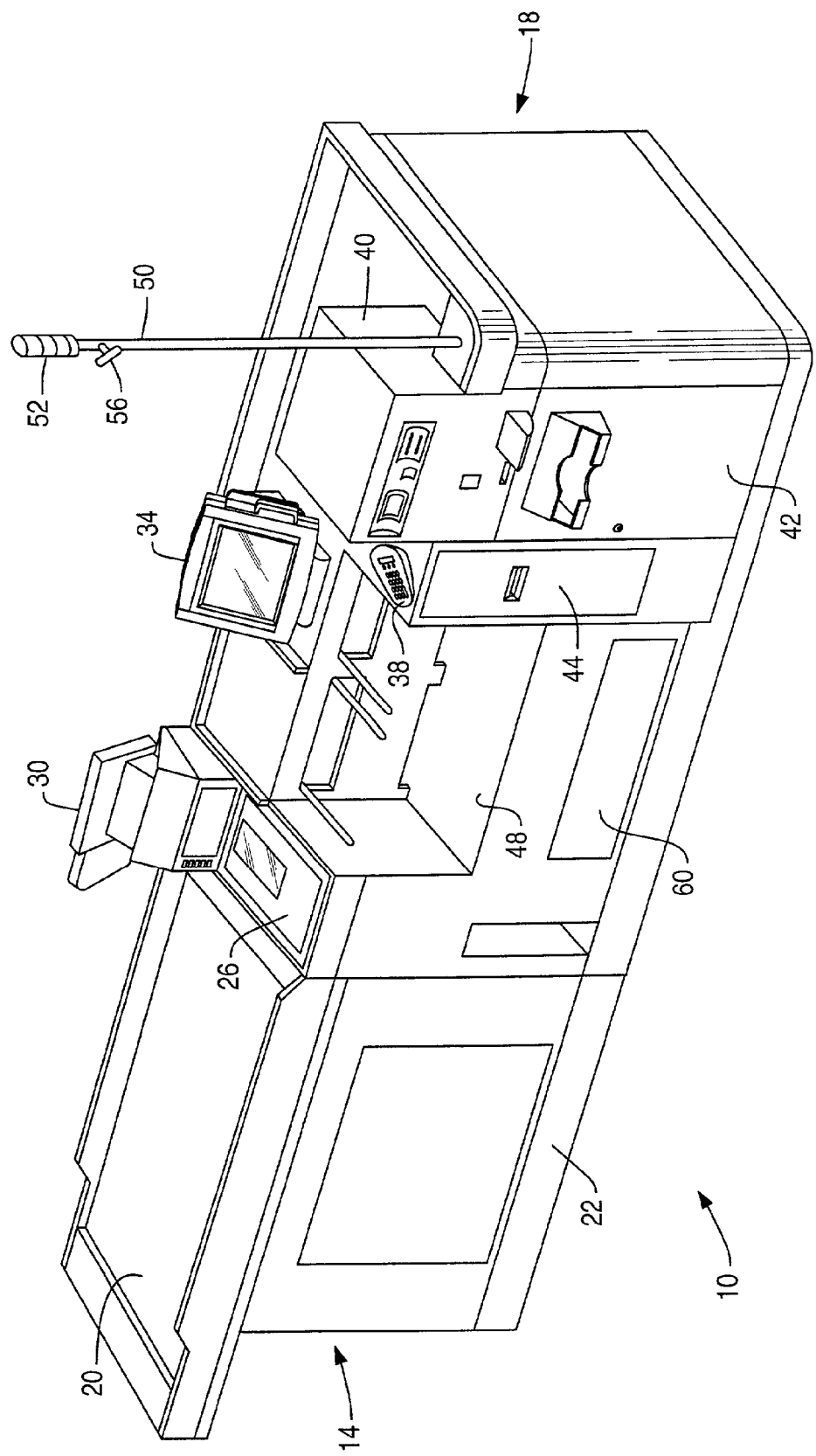
FIG. 1 depicts a self-checkout station in which the present invention may be used.

A self-checkout station used with the system and method of the present invention is shown in FIG. 1. Self-checkout station 10 may include a feeder unit 14 and a checkstand 18. Feeder unit 14 includes a feeder belt 20 and housing 22 for the motor and control circuitry that operate feeder belt 20. Feeder unit 14 is movably coupled to checkstand 18 so the feeder belt may be aligned with scanner/scale unit 26. Checkstand 18 includes scanner/scale unit 26, cashier display and keypad 30, consumer terminal 34, a payment terminal 38 for entry of payment data, and receipt printer 44. Scanner/scale unit 26 uses a laser shining on a glass or other transparent platen to input data from bar codes applied to products or packages. Unit 26 also includes a scale for measuring the weight of items that are sold on a price/unit of weight basis. A cashier may enter item data using cashier display and keypad 30 when station 10 is configured in the cashier-assisted operational mode. Cashier display and keypad 30 are mounted by means of a swivel to scanner/scale unit 26 so assembly 30 may be turned away from the consumer side when station 10 is configured in the self-checkout mode. This is done so a consumer is less likely to be able to use assembly 30 to enter fraudulent item data. Consumer terminal 34 displays item data as it is entered through scanner/scale unit 26. Payment terminal 38 may be any known POS terminal that incorporates a keypad and card reader to support credit card, debit card, and other payment methods. Receipt printer 44 provides a consumer with a receipt itemizing the items purchased and the method of payment.

Separating receipt printer 44 and scanner/scale unit 26 is a security scale 48 in which are disposed bags for item storage and into which consumers may place scanned and weighed items. Security scale 48 uses item weight data derived from scanner/scale 26 or a database using a scanned unit product code (UPC) to verify that only the items scanned are placed on the security scale. The security scale is also referred to as a bagging area. Security agent software operates within terminal 34 to monitor security scale 48 and data from scanner 26 to determine whether alarm events are occurring at station 10. Alarm events include detection of items not scanned being added to the security scale area or items being removed from security scale 48 and replaced with items of a different weight. Detection of an alarm events in previously known self-checkout stations results in the generation of a displayed or audible message on terminal 34 that directs the consumer to rescan an item or otherwise perform some checkout operation. Additionally, the security agent software in previously known systems may light a warning or alert lamp within the tri-color indicator mounted at the terminal end of indicator pole 50 of checkstand 18. As discussed in more detail below, the system and method of the present invention generate event messages corresponding to detected alarm events to enhance security operations for a store. Indicator pole 50 may also have mounted thereon a security camera for providing a video signal to a security officer surveillance area or to some storage media. A database, disk drive, or other computer peripheral required for station operation may be housed within peripheral tray 60 located within checkstand 18. Checkstand 18 also includes upper currency module 40 for receiving currency and coins from a consumer as payment for a transaction while lower currency module 42 returns change to a consumer.

As shown in FIG. 1, a consumer may place items on feeder belt 20 and belt 20 is driven to bring items to the end of belt 20 where a shut-off mechanism stops belt 20. The consumer may then remove items from belt 20 and move them, one at a time, by scanner/scale 26 for item product data retrieval and/or weighing. The scanned items may then be placed in bags on security scale 48. Once all of the items are scanned, a consumer may provide payment through payment terminal 38 or currency module 40, receive change from module 44, and a receipt from printer 44. The consumer may then remove the bags from security scale 48 and leave station 10.

Figure 2:
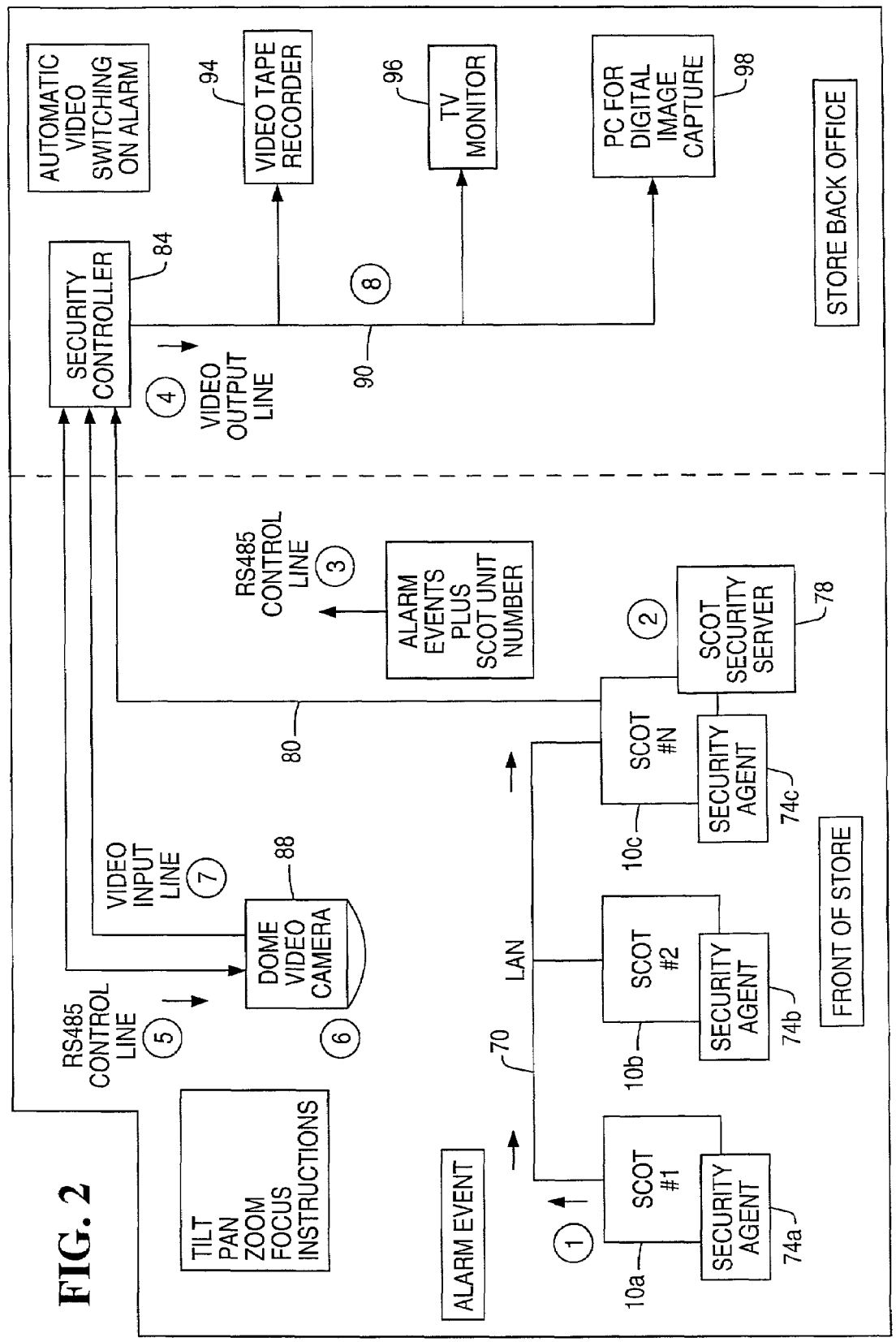
FIG. 2 is a block diagram of an arrangement of self-checkout stations and security equipment incorporating the system and method of the present invention.

An arrangement of stations and security equipment using the system and method of the present invention is shown in FIG. 2. Self-checkout stations 10a, 10b, and 10c are coupled to one another by a computer network 70 such as a local area network (LAN). Each station includes security agent software 74a, 74b, and 74c that executes within terminal 34 to detect alarm events at a station. Terminal 34 typically uses a Pentium processor with 128 MB of RAM and a 10 GB hard drive. Security agent software may be written with programmed instructions in any known computer language supported by and compatible with the operating system of terminal 34. Security agent applications 74a, 74b, and 74c monitor events occurring at stations 10a, 10b, and 10c, respectively. Thus, data from scanner/scales 26, a product database, security scale 48 and other peripherals coupled to terminal 34 for supporting consumer transactions at station 10 are used by the security agent applications to detect alarm events. For example, unit product codes (UPC) are determined from bar codes read by scanner 26 and used to query a product database for product data such as weight and price. This data may be used by a security agent application to determine whether the weight added to scale area 48 after scanning of an item corresponds to the weight of the scanned product. If the weight of the item deposited in scale area 48 appreciably differs from the weight retrieved from the database, the security agent application determines that an alarm event has been detected. An event message identifying the detected event and station may then be generated by the security agent application for transmission over network 70.

Preferably, one of the terminals in the stations coupled to network 70 includes software so the terminal may act as a server 78 for the stations coupled to network 70. Server 78 collects the event messages and determines a priority level for the event messages received. For example, the first message regarding an event related to a user's checkout may indicate a typical mistake in coordinating the scanning of an item and placing it in bagging area 48. However, several such messages may indicate an attempt to defraud the store and such event messages may be assigned a high priority level. Event messages may be transmitted with their assigned priorities as alert messages to controller 84 over communication link 80 or server 78 may only transmit those messages having a particular priority level and locally store the event messages having a lower priority level for later batch processing or deletion. Also, transmission of alert messages may be done in accordance with the assigned priority levels.

Security controller 84 may be coupled to server 78 via a control communication link 80 which is preferably an RS 485 communication line, although other communication protocols and specifications may be used for server/controller communication. Security controller 84 is used to control security devices and it is preferably located in the back office of the store in which stations 10a, 10b, and 10c are being used. Security controller 84 may be coupled to security devices such as an array of surveillance cameras that may include one or more dome cameras mounted at locations so the camera may view more than one station. The camera array coupled to security controller 84 may also include each camera mounted to indicator poles 50a, 50b, and 50c at stations 10a, 10b, and 10c, respectively. The video output of each camera coupled to controller 84 may be switched to provide the video stream of the camera to one of the image data security devices coupled to the controller. Within the back office, controller 84 may be coupled to a VCR 94, a television monitor 96, and a frame grabber 98 or the like for the capture or display of video data. Although security controller 84 is preferably coupled to a server 78, controller 84 may act as a server to stations 10a, 10b, and 10c or the stations may be interfaced to controller 84 in some other known manner. For purposes of the invention, controller 84 receives alert messages identifying security events occurring at self-checkout stations and controls security devices to enhance image data generation and recording or to attract security officer attention to the incident.

Security controller 84 parses the alert messages and determines from the priority level which security device should be controlled and the type of control operation to be performed. Lower level priorities may simply require the recording of data for later analysis. Such low level priority messages are processed by controller 84 to generate control messages to a dome camera 88, for example, so the servo-mechanism to which it is mounted rotates the camera towards the station identified by the identifier in the message. Additional control messages may operate the camera to zoom on the terminal area of the corresponding station, to pan the area in the vicinity of the identified station, or to focus the lens of the camera. While the camera control messages have been discussed with reference to dome camera 88, control messages may be generated for control of one or more cameras mounted to the indicator poles of one or more stations. By performing such control operations, the system of the present invention makes obfuscation of a person's identification more difficult because the operator of a station may be recorded from more than one perspective.

The output of one or more cameras under the control of controller 84 may be directed to one of the image recording devices coupled to controller 84. For example, controller 84 may switch the output of one camera to VCR 94 for continuous capture of image data from the camera or the output may be directed to frame grabber 98 to capture still images from the camera. If multiple cameras are being used to capture data of an incident at a station, one camera's output may be directed to one data capture device and another camera's output may be directed to another data capture device. Alternatively, multiple data capture devices of the same type may be coupled to controller 84 so video streams from multiple cameras may be continuously recorded at the same time. Preferably, the video streams generated by cameras in the system of the present invention include data identifying the camera parameters, date, time of day, and station during the recording. Such cameras are well known.

Controller 84 may also determine that higher priority events require human surveillance by a security officer for possible immediate action. In response to higher priority events, controller 84 may switch a video stream from a camera to monitor 96. To enhance the likelihood that an officer will view the displayed video, controller 84 may include a flashing alert indicator in the video stream for display on the screen and/or providing an audible oscillating tone in the audio portion of the video stream. Controller 84 may also include the station identifier and/or event identification data in the video stream for display on monitor 96 so the officer may better evaluate the security risk occurring at the identified station. An officer viewing the video stream may either manually control the cameras through a control panel (not shown) or direct another security officer to investigate the occurrences at the identified station. A telephone or paging system (not shown) may be coupled to controller 84 to activate a pager worn by a security officer. The paging message may include data identifying the station generating the event messages being processed as alert messages by controller 84. If a cellular telephone system is used, controller 84 may initiate a call to a cellphone associated with a security officer and include text and image data to facilitate the officer's investigation of the security events occurring at the identified station. The text data may include the station identifier and/or event identifier from the alert message.

Figure 3:
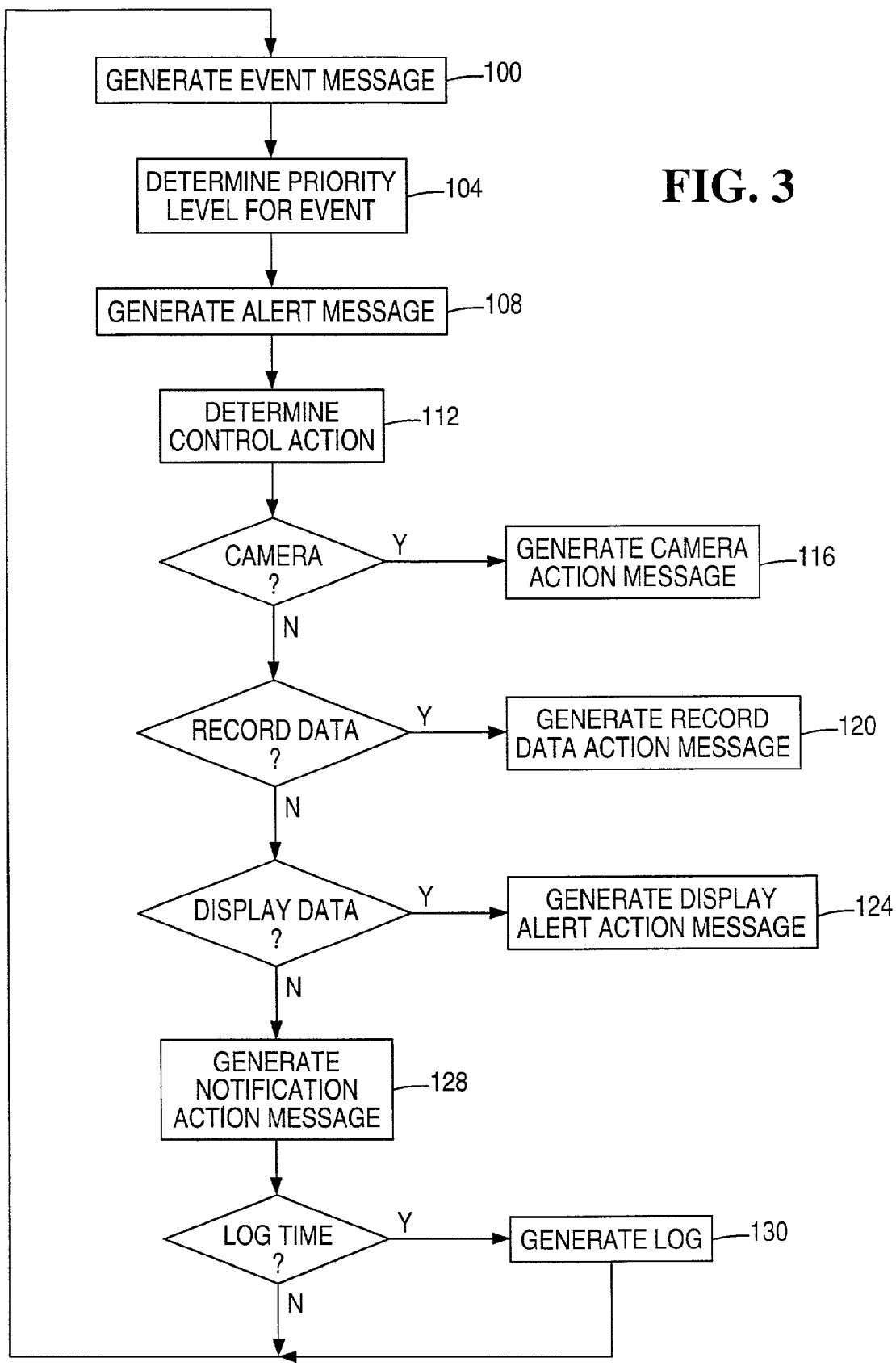
FIG. 3 is a flowchart of an exemplary method for enhancing security in the checkout station arrangement shown in FIG. 2.

An exemplary method that may be used to implement the principles of the present invention is shown in FIG. 3. After security agent executing on a self-checkout station has generated an event message with event data and a station identifier (block 100), a server may evaluate a received event message and determine a priority level for the event (block 104). The server may then generate an alert message that identifies the station, the event, and the priority assigned to the event (block 108). At a security controller, the received alert messages are parsed and the assigned priorities used to determine the type of control action to perform (block 112). The control actions may be a camera control action (block 116), a recording data action (block 120), a display alert action (block 124), and/or a security officer notification action (block 128). The camera control actions include zoom, pan, tilt (rotate), and focus operations for the camera or cameras controlled during an incident. The recording data actions include directing video data from a camera to a VCR or frame grabber. Display alert actions include switching a video stream to a TV monitor and may include the insertion of alert indicators in the video stream for attracting the attention of security officers. The alert indicators may include text messages that include the station identifier and/or event identification data from the alert message. Security officer notification actions may include activation of a page or cellular telephone call for a security officer. Preferably, the page includes a station identifier so the officer may proceed to the station and observe the incident in progress. The content of the cellular telephone message may include text data, such as station and/or event identification data, and image data. As long as alert messages are being received, the controller processes them for security device control operations. Periodically or following the conclusion of a timeout period that has expired since the last alert message received from a particular station, controller 84 may generate a log identifying the events contained in the alert messages and the time duration of the incident producing the events (block 130). This data may be used to determine whether the videotapes or still images should be reviewed or erased.

While the present invention has been illustrated by the description of exemplary processes and system components, and while the various processes and components have been described in considerable detail, it is not the intention of the applicant to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A system for enhancing security for a self-checkout station comprising:
    a number of security devices;
    a server for receiving an event message from the self-checkout station containing an event indicative of a security violation during a transaction and self-checkout station identification information, for assigning a priority level based upon the event, and for generating an alert message containing the event and the priority level if the priority level is at least a threshold priority level;
    a security controller for parsing the alert message to obtain the event, the priority level, and the self-checkout station identification information, for determining one of the security devices and a control procedure from the priority level, and for generating a control message for controlling the one security device in accordance with the control procedure.

2. The system of claim 1 wherein the one security device is a camera and the control message from the security controller controls zoom, pan, tilt, and focus operations of the camera.

3. The system of claim 2 wherein the camera comprises a dome camera mounted to a ceiling above the self-checkout station.

4. The system of claim 1 wherein the one security device is an image data recording device and the control message directs a video stream from a camera at the self-checkout station to the image data recording device.

5. The system of claim 1 wherein the one security device is an image display device and the control message directs a video stream from a camera at the self-checkout station to the image data display device.

6. The system of claim 5 wherein the security controller includes a flashing alert indicator in the video stream.

7. The system of claim 5 wherein the security controller includes a station identifier in the video stream.

8. The system of claim 5 wherein the security controller includes an event identifier in the video stream.

9. The system of claim 1 wherein the one security device is a television and the control message directs an audio video stream from a camera at the self-checkout station to the television, and wherein the security controller includes an audible oscillating alert tone in the audio video stream.

10. The system of claim 1 wherein the one security device is a pager associated with a security officer, wherein the control message contains the self-checkout station identification information, and wherein the security controller transmits the control message to the pager so that the security officer may observe the self-checkout station.

11. The system of claim 1 wherein the server comprises another self-checkout station.

12. A method of enhancing security for a self-checkout station comprising:
   a) parsing an alert message from a server coupled to the self-checkout station by a security controller to obtain an identifier of the self-checkout station, an event occurring at the self-checkout station and reported to the server by the self-checkout station, and a priority level assigned to the event by the server which is at least a threshold priority level;
   b) determining a security device from a number of security devices by the security controller;
   c) determining a control procedure from the priority level by the security controller;
   d) generating a control message for controlling the security device in accordance with the control procedure by the security controller; and
   e) sending the control message to the security device by the security controller.

13. The method of claim 12 wherein the security device comprises a camera and step c) includes zooming, panning, tilting, and focusing the camera.

14. The method of claim 12 wherein the security device comprises an image data recording device and step c) includes directing a video stream from a camera at the self-checkout station to the image data recording device.

15. The method of claim 12 wherein the security device comprises an image display device and step c) includes directing a video stream from a camera at the self-checkout station to the image display device.

16. The method of claim 15 wherein step c) further comprises inserting a flashing alert indicator in the video stream.

17. The method of claim 15 wherein step c) further comprises inserting the station identifier in the video stream.

18. The method of claim 15 wherein step c) further comprises inserting an event identifier in the video stream.

19. The method of claim 12 wherein the security device comprises a television and step c) includes directing an audio video stream from a camera at the self-checkout station to the television and inserting an audible oscillating alert tone in the audio video stream.

20. The method of claim 12 wherein the security device comprises a pager and step c) includes transmitting the station identifier to the pager so that the security officer may observe the self-checkout station.

* * * * *